United States Patent

Sakomura et al.

[15] 3,696,173

[45] Oct. 3, 1972

[54] GRAFT COPOLYMER OF VINYL CHLORIDE ONTO HIGH MOLECULAR WEIGHT POLYTETRAHYDROFURAN

[72] Inventors: Toshio Sakomura; Toshiro Yoshida; Yoshihiro Fujita; Hideo Shinbara, all of Yamaguchi, Japan

[73] Assignee: Toyo Soda Manufacturing Co., Ltd., Yamaguchi-ken, Japan

[22] Filed: March 13, 1970

[21] Appl. No.: 19,502

[30] Foreign Application Priority Data

March 18, 1969 Japan......................44/20098

[52] U.S. Cl. ........260/899, 260/31.2 R, 260/45.75 K
[51] Int. Cl. ...........................C08f 29/24, C08f 37/18
[58] Field of Search......................................260/899

[56] References Cited

UNITED STATES PATENTS 3,247,291  4/1966  Kahrs et al..................260/899
3,281,499  10/1966  Dolce et al. ................260/874
3,398,074  8/1968  Eguchi..................204/159.15
3,632,840  1/1972  Vandenberg..............260/899
3,544,487  12/1970  Dunlop et al..................260/2
3,544,659  12/1970  Schwab et al..............260/874
3,546,321  12/1970  Jabloner et al............260/874
3,548,037  12/1970  Dreyfuss et al............260/899

Primary Examiner—Murray Tillman
Assistant Examiner—John Seibert
Attorney—Flynn & Frishauf

[57] ABSTRACT

A method of preparing a clear, high impact strength vinyl chloride polymer is described.

Monomeric vinyl chloride is polymerized in a solution of high molecular weight polytetrahydrofuran therein to produce a graft-polymer which is transparent and has high impact strength.

A graft-polymer product having improved transparency and impact strength is also described.

8 Claims, No Drawings

GRAFT COPOLYMER OF VINYL CHLORIDE ONTO HIGH MOLECULAR WEIGHT POLYTETRAHYDROFURAN

This invention relates to a method of preparing a vinyl chloride polymer which is transparent and which has an improved impact strength. More particularly, the invention relates to a method of producing a clear, impact strength vinyl chloride polymer, comprising grafting vinyl chloride onto a tetrahydrofuran polymer. In a second aspect, the invention relates to a clear, high impact strength polymer having the structure attained by the above method.

Of the vinyl chloride polymers currently in common use, those of rigid, transparent formulas offer the advantage of increased transparency and tensile strength, but have the serious disadvantage that they are invariably low in impact strength.

To overcome this drawback, it has been proposed to blend a vinyl chloride polymer with various elastomeric polymers such as ethylene-vinyl acetate copolymers, acrylate polymers and so forth. Those formulations, however, lead to products having a considerably reduced transparency. As attempts to enchance the impact strength of vinyl chloride polymers without sacrificing their transparency, it has been suggested to blend a vinyl chloride polymer with 10 to 15 percent by weight of a methyl methacrylate-butadiene-styrene copolymer or an acrylonitrile-butadiene-styrene copolymer. However, since those butadiene copolymers contain unsaturations in their molecules, they undergo rapid decreases in impact strength on exposure to direct sunlight. Aside from those blends, some graft-polymers have been suggested. Thus, a solution of an ethylene-vinyl acetate copolymer or an acrylic ester polymer in monomeric vinyl chloride is employed. However, the resulting polymer invariably has much to be desired in terms of transparency.

To overcome the foregoing disadvantages, we conducted an extensive study. This study has led us to the finding that the impact strength of a vinyl chloride polymer may be enhanced without sacrificing its intrinsic transparency and weather ability by dissolving a tetrahydrofuran polymer in monomeric vinyl chloride and allowing the monomeric vinyl chloride to polymerize to cause a portion thereof to be grafted onto said tetrahydrofuran polymer.

It is an object of this invention to prove a method of producing a clear, high impact strength polymer.

Another object is to provide a method of producing a novel graft-copolymer of vinyl chloride onto polytetrahydrofuran.

Still another object is to provide a new vinyl chloride graft-copolymer which has a high tensile impact strength.

Other objects and advantages of this invention will become apparent as the following description of the invention proceeds.

The tetrahydrofuran polymer which is to be employed according to this invention may be prepared by a method which is conventional per se. For instance, monomeric tetrahydrofuran may be caused to undergo a ring-opening polymerization in the presence of a catalyst which may for example be triethyl aluminum and water, or boron trifluoride.

To enhance the impact strength of a vinyl chloride polymer, it is necessary that said tetrahydrofuran polymer have a sufficiently high molecular weight to make it rubbery or plastic in consistency. Thus, the polymer preferably has a molecular weight in the range of about 20,000 to 400,000 and, for better results, from about 100,000 to 200,000.

In accordance with this invention, said tetrahydrofuran polymer is dissolved in monomeric vinyl chloride and, then, the vinyl chloride is allowed to polymerize in a manner that is conventional per se.

This polymerization reaction may be conducted by any of the bulk, solution, suspension and emulsion polymerization methods, although the suspension polymerization method is generally preferred for commercial purposes. As the polymerization initiator, any of the conventional radical polymerization initiators may be used to advantage. Thus, azo-bis-isobutyronitrile, butyl perpivalate and benzoyl peroxide may be mentioned by way of example. The proportion of said tetrahydrofuran polymer to be thus employed depends upon the desired conversion of vinyl chloride into polymer. Generally speaking, the preferred proportion ranges from 1 to 15 percent by weight and, for better results, from 2 to 10 percent by weight, relative to the weight of the final graft-polymer.

The articles manufactured by merely compounding a tetrahydrofuran polymer with a vinyl chloride polymer and compression-molding the mixture reveal improvements in impact strength but are white and opaque.

In contrast, the products obtained by the grafting method according to this invention not only show marked improvements in impact strength but also reveal only insignificant reductions in transparency. In addition, because of their substantial freedom from unsaturation, those polymers have excellent weather ability. The tetrahydrofuran polymers which may be employed in the practice of this invention include not only polytetrahydrofuran but also the copolymers of tetrahydrofuran with ethylene oxide, propylene oxide, epichlorohydrin and so forth. The aforesaid vinyl chloride monomer may be a mixture of vinyl chloride and a different monomer copolymerizable with vinyl chloride, such as vinyl acetate or vinylidene chloride, for instance. The following examples are further illustrative of this invention.

EXAMPLE 1

A cylindrical vessel of stainless steel was charged with 117 g tetrahydrofuran, followed by the addition of 16.2 milliliters each of triethyl aluminum, water and epichlorohydrin. The system was allowed to stand at 0°C for 24 hrs., during which time the monomers were polymerized. The unreacted tetrahydrofuran monomer was removed in vacuo to recover 48 g of a tetrahydrofuran polymer. This polymer had a molecular weight of 150,000 as calculated by the following equation.

$$[\nu] = 0.00131 \times M^{0.60} \text{ (in benzene at 30°C)}$$

A 20 g portion of the above tetrahydrofuran polymer was put in a 2 l-autoclave equipped with agitator means, and the internal atmosphere was replaced with nitrogen which was then completely evacuated. Then, 400 g of monomeric vinyl chloride was added. The mixture was stirred at 70°C for 2 hrs to dissolve the tetrahydrofuran polymer. The solution was allowed to cool to room temperature, and 1,200 ml water containing 0.56 g tert-butyl perpivalate and 0.2 percent hydroxypropylmethyl cellulose (from which the dissolved oxygen had been removed) was added by means of a metering pump.

The system was re-heated to 60°C, at which temperature the polymerization reaction was allowed to proceed for 170 minutes. The resulting polymeric product was washed with water and dried. Yield 357 g. 100 weight parts of the above polymer was blended well with 3 weight parts dibutyl-tin-mercaptide stabilizer, 1 weight part dibutyl-tin-laurate stabilizer and 0.5 weight part butyl stearate, and the blend was milled on a mixing roll at 170°C for 10 minutes. The resulting mixture was compression-molded at 170°C into a sheet 2 millimeters thick. The result of a tensile impact test on 1822-61sheet in accordance with ASTM-D-1821-61T showed that the average tensile impact strength of 10 S-shaped specimens of the same sheet was 138 kg-cm/cm$^2$. The tensile strength of the above sheet as measured by the method according to JIS-K-6745 (1963) was 478 kg/cm$^2$.

The average transmittance of the same specimens at the wave length of 650 m$\mu$ was 70 percent.

CONTROL EXAMPLE 1

By the procedure described in Example 1, except that the tetrahydrofuran polymer was dispensed with, vinyl chloride was polymerized at 60°C for 230 minutes to prepare 328 g of a vinyl chloride polymer. This polymer was molded into a sheet 2 millimeters thick in the same manner as Example 1. The average tensile impact strength of 10 test specimens of the above sheet was 65 kg-cm/cm$^2$. The average tensile strength and transmittance (at 650 m$\mu$) of the same specimens were 560 kg/cm$^2$ and 80 percent, respectively.

EXAMPLES 2 – 7

With use of the tetrahydrofuran polymers prepared in the same manner as Example 1, vinyl chloride was allowed to polymerize in the manner described in Example 1. In those examples, however, the polymerization temperature of tetrahydrofuran was varied to alter the molecular weight of the tetrahydrofuran polymer, and the ratio of this tetrahydrofuran polymer to vinyl chloride was also varied. Samples were prepared and tested by the methods described in Example 1. The results are set forth in Table 1.

CONTROL EXAMPLE 2

One-hundred parts by weight of the vinyl chloride polymer obtained in Control Example 1 was mixed with the various stabilizers mentioned Example 1, followed by the addition of 3 weight parts of the tetrahydrofuran polymer prepared in Example 1. The resulting composition was roll milled and compression-molded. The product had a tensile impact strength of 110 kg-cm/cm$^2$, but was white in color and quite opaque.

EXAMPLE 8

The inside of a separable flask of 2 l capacity was dried and the internal atmosphere was replaced with nitrogen. The flask was then charged with 1,400 g tetrahydrofuran, and a current of nitrogen was introduced.

Under stirring, 24.5 g triethyl aluminum, 3.9 g water and 19.8 g epichlorohydrin were added in the order mentioned. The system was left standing at 15°C for 48 hrs, whereby the monomers were polymerized. The unreacted tetrahydrofuran was removed under reduced pressure to obtain 744 g of a crude tetrahydrofuran polymer. This polymer had a molecular weight of 114,000 as calculated by the equation given in Example 1. With use of 20 g of the above tetrahydrofuran polymer, 390 g vinyl chloride and 10 g vinyl acetate, the polymerization reaction was conducted in the manner described in Example 1 for 220 minutes, whereupon 369 g of a graft-polymer was obtained. As measured by the methods described in Example 1, this polymer had a tensile impact strength of 120 kg-cm/cm$^2$, a tensile strength of 472 kg/cm$^2$ and, as a 2 mm thick sheet, a transmittance (at 650 m$\mu$) of 76 percent.

EXAMPLE 9

A separable flask of 300 ml capacity was charged with 125 g tetrahydrofuran, 2.0 g triethyl aluminum, 0.3 g of water and 16.1 g epichlorohydrin, and the monomers were allowed to polymerize at 0°C for 48 hrs. The procedure yielded 91.6 g of a crude polymer. As calculated by the equation described above, this polymer had a molecular weight of 123,000. With use of 20 g of this polymer and 400 g of vinyl chloride monomer, a polymerization reaction was conducted in the manner described in Example 1 for 210 minutes. The reaction yielded 371 g of a graft-polymer which had a tensile impact strength of 111 kg-cm/cm$^2$, a tensile strength of 495 kg/cm$^2$ and, as a 2 mm thick sheet, a transmittance (at 650 m$\mu$) of 70 percent.

TABLE 1.—EXAMPLES 2-7

Common conditions for polymerization of vinyl chloride:
Vinyl chloride monomer: 400 g.
Water (hydroxypropylmethyl cellulose, 0.2% solution): 1,200 me.
Tert-butyl perpivalate: 0.56 g.

| Example No. | Tetrahydrofuran polymer | | Polymerization temperature, °C. | Polymerization time, hr. min. | Yield of graft-polymer | Percent tetrahydrofuran polymer in graft-polymer | Tensile impact strength, kg.-cm./cm.$^2$ | Tensile strength, kg./cm.$^2$ | Transmittance (at 650 m.) percent | Elongation, percent |
|---|---|---|---|---|---|---|---|---|---|---|
| | Mol. wt. ×10,000 | Grams | | | | | | | | |
| 2 | 13.6 | 20 | 60 | 4.10 | 369 | 5.4 | 165 | 483 | 61 | 158 |
| 3 | 14.5 | 40 | 60 | 1.50 | 369 | 10.8 | 166 | 411 | 40 | 142 |
| 4 | 14.5 | 10 | 60 | 5.00 | 340 | 2.9 | 145 | 549 | 79 | 170 |
| 5 | 21 | 5 | 60 | 2.30 | 322 | 1.6 | 80 | 570 | 78 | 195 |
| 6 | 21 | 20 | 64 | 1.30 | 332 | 6.0 | 100 | 500 | 64 | 180 |
| 7 | 4 | 20 | 60 | 4.00 | 357 | 5.6 | 115 | 500 | 62 | 190 |

NOTE.—A different polymerization temperature was used for Example 6.

EXAMPLE 10

In a separable flask of 300 ml capacity, 100 g tetrahydrofuran, 1.6 g triethyl aluminum and 16.1 g propylene oxide were mixed together. After a polymerization time of 90 hrs, 27 g of a crude polymer was obtained. As calculated by the above equation, this polymer had a molecular weight of 237,000.

Using 20 g of this polymer and 400 g of vinyl chloride, a polymerization reaction was conducted in the manner described in Example 1 for 210 minutes. In this example, however, the dissolution of the polymer in vinyl monomer was carried out at room temperature over a period of 3 hours. The resulting polymer weighed 330 g. This product had a tensile impact strength of 121 kg-cm/cm$^2$, a tensile strength of 469 kg/cm$^2$ and, as a 2 mm thick sheet, a transmittance (at 650 m$\mu$) of 73 percent.

EXAMPLE 11

A separable flask of 300 ml capacity, the internal atmosphere of which had been replaced with nitrogen, was charged with 100 g tetrahydrofuran, and under stirring in a current of nitrogen gas, 18 g boron trifluoride was added. The system was left standing at 0°C for 8 days to allow the monomer to polymerize.

The resulting polymer was put in a large amount of methanol, and the polymer was recovered and dehydrated in vacuo. Yield 43 g.

As calculated by the above equation, this polymer had a molecular weight of 360,000. Using 20 g of this polymer and 400 g monomeric vinyl chloride, a polymerization reaction was conducted in the manner described in Example 1, except that, as an initiator, 0.8 g lauroyl peroxide was used in place of the tert-butyl perpivalate.

The polymerization reaction was conducted at 60°C for 260 minutes to obtain 350 g of a polymer. This product, as measured by the testing methods hereinbefore described, had a tensile impact strength of 130 kg-cm/cm$^2$, a tensile strength of 467 kg/cm$^2$ and, as a 2 mm thick sheet, a transmittance (at 650 m$\mu$) of 70 percent.

We claim:

1. A method of preparing a clear, impact strength polyvinyl chloride graft polymer, comprising dissolving a high molecular tetrahydrofuran homopolymer or copolymer, said tetrahydrofuran homopolymer or copolymer having a molecular weight in the range of about 20,000 to 400,000, in monomeric vinyl chloride and polymerizing said monomeric chloride in the presence of a polymerization initiator to produce a graft-polymer containing 1 to 15 percent by weight of the tetrahydrofuran homopolymer or copolymer based on the weight of the graft-polymer.

2. A method according to claim 1, wherein said monomeric vinyl chloride is a mixture of vinyl chloride monomer and a vinyl acetate or vinylidene chloride.

3. A method according to claim 1, wherein said high molecular tetrahydrofuran copolymer is a copolymer of tetrahydrofuran with ethylene oxide, propylene oxide or epichlorohydrin.

4. A method defined by claim 1, wherein the graft-polymer contains 2 to 10 percent by weight of said tetrahydrofuran homopolymer or copolymer.

5. A method according to claim 1, wherein said tetrahydrofuran homopolymer or copolymer has a molecular weight in the range of 100,000 to 200,000.

6. A method defined by claim 1, wherein said tetrahydrofuran homopolymer has a molecular weight of from about 100,000 to 200,000.

7. A method according to claim 1, wherein said tetrahydrofuran copolymer has a molecular weight in the range of 100,000 to 200,000.

8. A clear vinyl chloride polymer product of high impact strength obtained by the methods described in claim 1.

* * * * *